United States Patent [19]

Johnson et al.

[11] Patent Number: 5,067,641

[45] Date of Patent: Nov. 26, 1991

[54] VEHICLE BICYCLE CARRIER

[75] Inventors: Richard B. Johnson, Tecumseh; Thomas P. Schneider, Ypsilanti, both of Mich.

[73] Assignee: Valley Industries, Inc., Madison Heights, Mich.

[21] Appl. No.: 472,037

[22] Filed: Jan. 30, 1990

[51] Int. Cl.$^5$ .............................................. B60R 9/00
[52] U.S. Cl. .................... 224/042.03 B; 224/42.03 R; 224/42.43
[58] Field of Search .................. 224/42.03 R, 42.03 B, 224/42.43, 42.44, 42.45 R, 42.46 R; 211/17, 18

[56] References Cited

U.S. PATENT DOCUMENTS

| 640,736 | 1/1900 | Biester | 211/18 |
|---|---|---|---|
| 3,917,138 | 11/1975 | Bergeron | 224/42.03 B |
| 4,298,151 | 11/1981 | O'Connor | 224/42.03 B |
| 4,461,413 | 7/1984 | Hoerner | 224/42.03 B |
| 4,676,413 | 6/1987 | Began et al. | 224/42.03 B |
| 4,676,414 | 6/1987 | Deguevara | 224/42.03 R |
| 4,700,845 | 10/1987 | Fretter | 211/18 |
| 5,004,133 | 4/1991 | Wyers | 224/42.03 B |

Primary Examiner—Henry J. Recla
Assistant Examiner—Keith Kupferschmid
Attorney, Agent, or Firm—Alex Rhodes

[57] ABSTRACT

A bicycle carrier with a three point mounting arrangement for carrying bicycles on the rear of a motor vehicle. The carrier has a central upright member with a lower end structure for detachably securing the bicycle carrier to a conventional draw bar hitch which is attached to the motor vehicle. The base end portion of a rearward extending swing arm is pivotally attached to the upper end of the upright member and a short distance below the swing arm there is a lateral member which is centered and fixed to the lateral member. A pair of spaced apart hanger brackets extend longitudinally from attachments to the lateral member, to mount each bicycle at two points on the carrier. The swing arm is releasably rotatable about a transverse axis from a horizontal locked position adjacent to the hanger brackets to an upward position away from the hanger brackets. Below the hanger brackets there are short and long longitudinally extending brackets and circular clamps which co-act with the brackets to mount and secure each bicycle at a third point on the carrier.

14 Claims, 2 Drawing Sheets

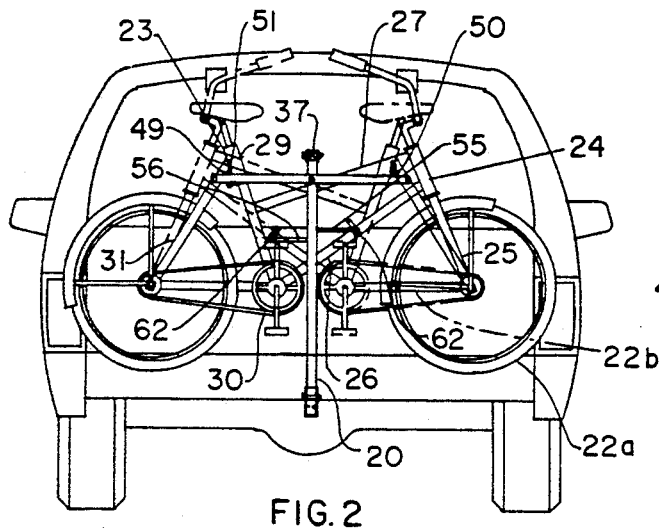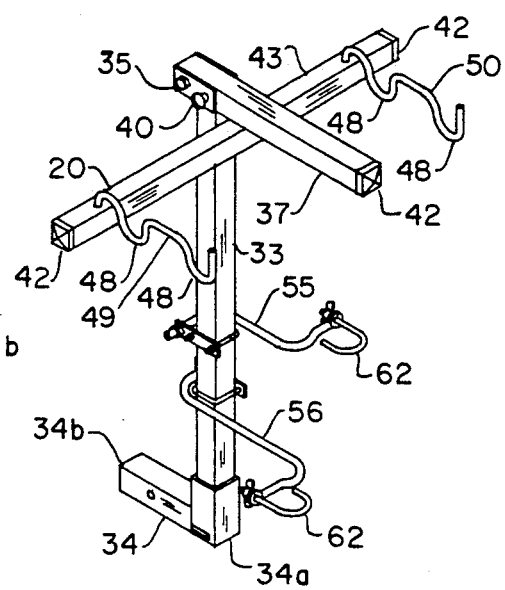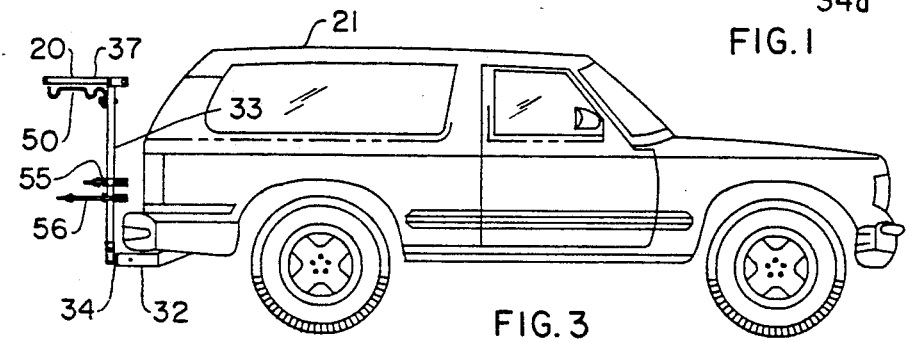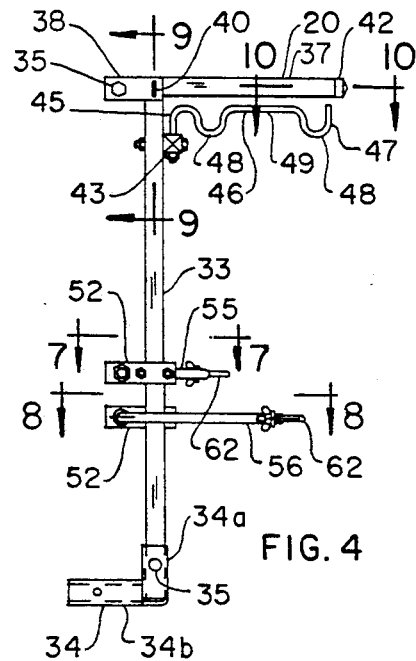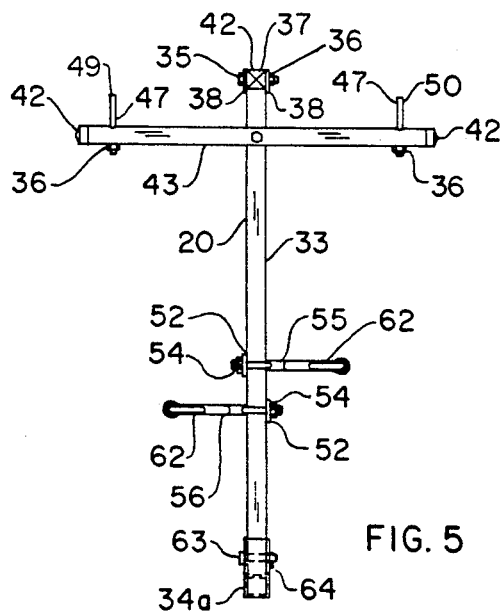

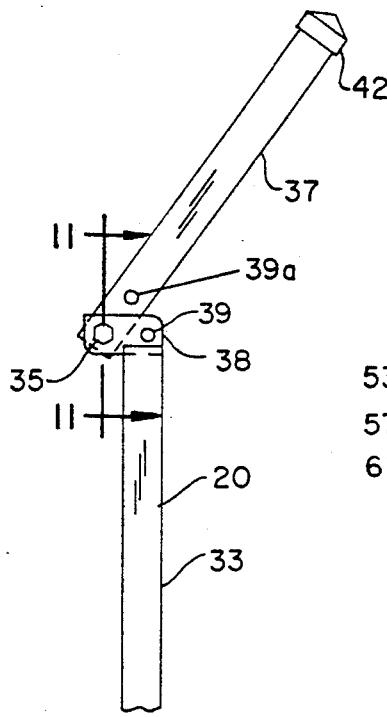
FIG. 6
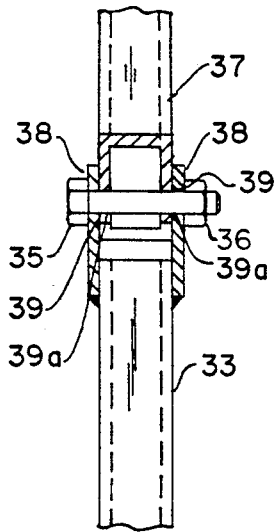
FIG. 11
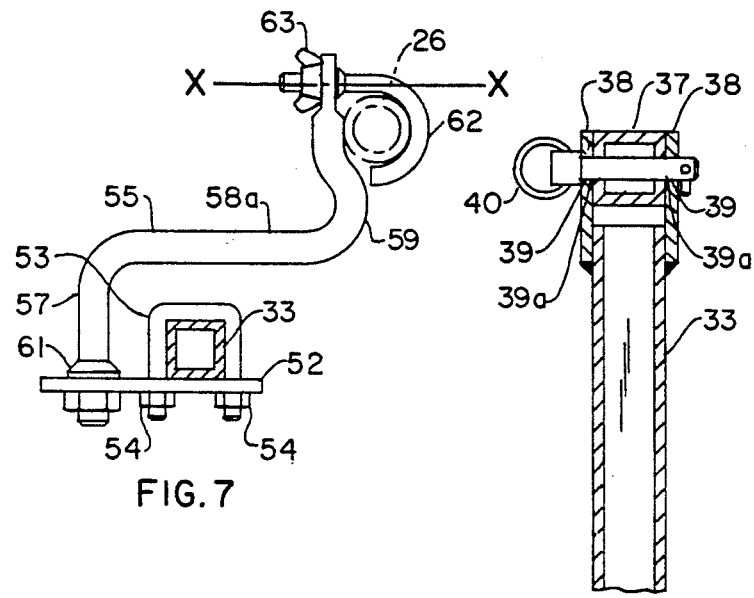
FIG. 7
FIG. 8
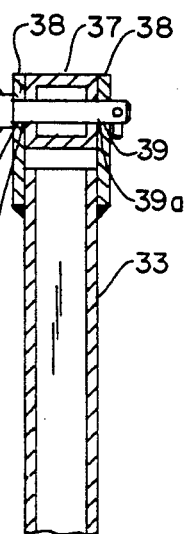
FIG. 9
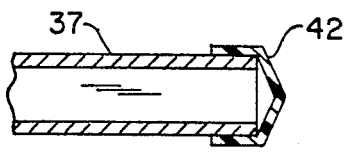
FIG. 10

VEHICLE BICYCLE CARRIER

BACKGROUND OF THE INVENTION

This invention relates generally to vehicle article carriers and more particularly to a detachable carrier for transporting bicycles on the rear end of a motor vehicle.

The increased popularity of bicycles and major changes in vehicle designs have created a need for an improved and easy to use carrier for transporting bicycles on motor vehicles. The two styles of bicycle carriers heretofore available, namely, the roof mounted carrier and the rear bumper mounted carrier are deficient in certain aspects. The roof carrier has the advantage of non-obstructed rear vision. However, it has not been widely accepted by the public because of its large size, unsightly appearance and high lift height for loading bicycles.

The rear bumper mounted carrier has been popular because of its smaller size and low lift height. However, the rear bumper mounted carrier has been difficult to attach to a vehicle, difficult to use and/or structurally deficient. Moreover, the substitution, in most passenger vehicles, of soft energy absorbing bumpers for steel bumpers has almost entirely obsoleted the bumper mounted carrier.

Another deficiency in many rear bumper mounted carriers has been the use of retaining ropes and straps for securing bicycles to the carriers. The use of the retaining ropes and straps has caused the reliability of the bicycle mountings to depend on some extent on the skill and care of the user.

SUMMARY OF THE INVENTION

The present invention is a sturdy, reliable, and easy to use vertical carrier for transporting bicycles, one behind the other, on current motor vehicles. One benefit of the invention is that neither retaining ropes or straps are required to secure bicycles to a carrier. Another benefit is that the carrier is adaptable to most bicycle makes and styles. Another benefit is that stresses and strains in the carrier and bicycles from misalignment are eliminated by a three point mounting arrangement.

The invention resides in its novel three point mounting arrangement for securing bicycles to the carrier as well as the specific features of the elements of the carrier. The vehicle carrier has an upright member with a mounting structure at its lower end for detachably securing the carrier to a conventional hitch at the rear of a motor vehicle. A rearward extending swing arm is pivotally attached to the upper end of the upright member and closely below the swing arm there is a lateral member, fixed to the upright member in vertical spaced apart relationship to the swing arm. A pair of spaced apart hanger brackets are attached to the end portions of the lateral member for supporting upper portions of bicycles at two points on the carrier. The hanger brackets extend longitudinally rearward from their fixed attachments to the lateral member and have retaining bends for positioning the pair of bicycles on the carrier.

The base end of the swing arm is pivotally attached to the upright member for angular displacement about a transverse axis and is releasably rotatable from a locked horizontal position adjacent to the hanger brackets to a raised position away from the hanger brackets for mounting and trapping upper portions of the bicycles on the hanger brackets. Below the lateral member is a pair of longitudinally rearward extending brackets and arcuate clamps which co-act to secure a lower third portion of each of the bicycles to the carrier.

Further benefits and features will be apparent from the ensuing description and accompanying drawings which disclose the invention in detail. The best mode contemplated in practicing the invention is disclosed and the subject matter in which exclusive rights are claimed is set forth in each of the numbered claims at the conclusion of the detailed description.

BRIEF DESCRIPTION OF THE DRAWINGS

FIG. 1 is a perspective view of a vehicle bicycle carrier which embodies the present invention.

FIG. 2 is a rear elevational view of a vehicle and bicycle carrier with a pair of bicycles mounted in opposite directions, one behind the other, on the rear end of the vehicle.

FIG. 3 is a side elevational view of the vehicle shown in FIG. 2 without the bicycles.

FIG. 4 is a left side elevational view of a bicycle carrier drawn to an enlarged scale from FIG. 3.

FIG. 5 is a rear elevational view of the carrier.

FIG. 6 is a partial left side elevational view drawn to an enlarged scale showing the carrier with the swing arm rotated upward.

FIG. 7 is a cross sectional view drawn to an enlarged scale taken on the line 7—7 in FIG. 4.

FIG. 8 is a cross sectional view drawn to an enlarged scale taken on the line 8—8 in FIG. 4.

FIG. 9 is a cross sectional view drawn to an enlarged scale taken on the line 9—9 in FIG. 4.

FIG. 10 is a cross sectional view drawn to an enlarged scale taken on the line 10—10 in FIG. 4.

FIG. 11 is a cross sectional view drawn to an enlarged scale taken on the line 11—11 in FIG. 6.

DETAILED DESCRIPTION OF THE PREFERRED EMBODIMENT

Referring now to the drawings wherein like numerals designate like and corresponding parts throughout the several views, a vehicle carrier 20 which is exemplary of the invention, is shown for illustrative purposes mounted on the rear end of a motor vehicle 21. A pair of women's bicycles 22a, 22b are mounted in opposite directions on the carrier 20 which can be used for carrying mens's and children's bicycles as well as women's bicycles.

The bicycles 22a, 22b are mounted in transverse relationship to the vehicle on the carrier 20, one behind the other, with the forward bicycle 22b shown in phantom. Each bicycle 22a, 22b has a frame 23 which includes a steering head 24, a front fork 25, a down tube 26, a dropped top tube 27, a seat tube 29, a pedal tube 30 and a rear fork 31. The dropped top tube 27 extends downwardly from the steering head 24 to the seat tube 29 and the down tube 26 which is below the top tube 27 extends downwardly from the steering head 24 to the pedal tube 30. The rear fork 31 is attached to the upper end portion of the seat tube 29 and extends downwardly away from the seat tube 29.

The carrier 20 is detachably secured to a conventional draw bar hitch 32 which is attached to the rear structure of the vehicle 21. The draw bar hitch 32 is an existing type of hitch which is commonly used for towing trailers. The carrier 20 has a slender upright rectangular member 33 which is detachably connected to the draw bar hitch 32 by a forward extending adapter member 34 at the lower end of the upright member 33. The adapter member 34 has a short vertical tubular member 34a for receiving the lower end portion of the vertical member 33 and a forward portion 34b which attaches to the hitch 32. The upright member 33 is secured to the adapter member 34 with a retaining pin 63 and wire retainer 64, or some other suitable fastening means.

At the upper end of the upright member 33 there is a slender rectangular swing arm 37 having a base end which is pivotally attached to the member 33 and extends longitudinally rearward from its attachment to the member 33. A pair of plates 38, welded to the sides of the upright member 33, straddle the base end of the swing arm 37. The plates 38 have apertures 39 which are aligned with corresponding apertures 39a in the swing arm 37. At the forward end portion of the swing arm 37 there is a pivot bolt 35 and a nut 36 which extend through the plates 38 and the arm 37. Spaced slightly forward of the pivot bolt there is a lock pin 40 which extends through the plates 38 and arm 37 and retains the arm 37 in a horizontal locked position. When the lock pin 40 is removed, the swing arm 37 is free to rotate about a transverse axis from the substantially horizontal locked position shown in FIG. 4 to the elevated position shown in FIG. 6. The outer end portion of the swing arm 37 is trimmed with an ornamental cap 42 which forcibly engages the outer surface of the arm 37.

Below the swing arm 37 there is a slender lateral rectangular tubular member 43 which is secured to the upright member 33 with a bolt 35 and nut 36. The lateral member 43 is centered on the upright member 33 and is vertically positioned in proximate downward spaced relationship to the swing arm 37. The ends of the lateral member 43 are trimmed with the ornamental caps 42.

Attached to the lateral member 43 at their base end portions is a pair of rearward extending rod type hanger brackets 49, 50. Each hanger bracket 49, 50 has a forward downward extending base end portion 45, an intermediate rearward extending horizontal portion 46 and a rearward upward extending portion 47. In the intermediate portion 46 there are a pair of concave retaining bends 48 for positioning the bicycles 22a, 22b, one behind the other, on the carrier 20. The brackets 49, 50 are attached to the cross member 43 with nuts 36 which engage the downward extending base end portions 45. When the swing arm 37 is in the horizontal locked position, shown in FIGS. 4 and 5, the upper portions of the bicycles 22a, 22b are trapped between the swing arm 37 and the hanger brackets 49, 50.

With reference to FIG. 2, the left hanger bracket 49 which supports the rearward bicycle 22a engages the inside corner 51 of the bicycle 22a where the rear fork 31 joins the seat tube 29 and the right hand hanger bracket 50 engages the dropped top tube 27. Below the hanger brackets 49, 50 there are a pair of plates 52 which are attached with "U" 53 bolts and nuts 54 to the upright member 33.

A pair of rearward extending horizontal rod type brackets 55, 56 is attached at their base end portions to the plates 52 with nuts 36. Each lower bracket 55, 56 has a short transverse forward portion 57, a rearward extending intermediate portion 58a, 58b and a short transverse rearward portion 59. At the rearward end portion of each plate 52 there is an aperture 60 which receives an end portion of each of the brackets 55, 56. At the opposite end portions of each of the brackets 55, 56 there is another aperture 60 which receives an end portion of an arcuate clamp 62. The clamps 62 are attached to the lower brackets 55, 56 with wing nuts 63 and when the wing nuts are loosened the clamps 62 are free to rotate about axes X—X.

Referring now to FIGS. 7 and 8, the brackets 55, 56 and clamps 62 secure a lower portion of each of the down tubes 26 of the bicycles 22a, 22b to the carrier 20 and are vertically adjustable on the upright member 33 by loosening the nuts 36. The rearward extending right hand bracket 55 is shorter than the rearward extending left hand bracket 56 whereby the right hand bracket 55 and clamp 62 can engage the down tube 26 of the front bicycle 22b and the left hand bracket 56 and clamp 62 may engage the down tube 26 of the opposite facing rear bicycle 22b.

With reference to FIG. 2, the invention is used in the following manner. The bicycle carrier 20 is attached to the vehicle 21 by telescopingly engaging the lower end portion of the upright member 33 with the hitch adapter 34. A retaining pin 63 and wire retainer 64 are then installed to secure the upright member 33 to the adapter 34.

Next, the carrier's swing arm 37 is unlocked on the upright member 33 by removing the lock pin 40 and the swing arm 37 is rotated upwardly in the manner shown in FIG. 6. A bicycle 22b (shown in phantom) is elevated and mounted at the forward position on the hanger brackets 49, 50 such that the forward retaining bend 48 of left hanger bracket 49 engages the corner 51 where the seat tube 29 joins the rear fork 31, and the forward retaining bend 48 of the right hanger bracket 50 engages the dropped top tube 27. The shorter lower rearward extending bracket 55 is adjusted vertically on the upright member 33 to engage the bracket with the down tube 26 of the forward bicycle 22b by loosening the "U" bolt 53 and sliding the plate 52 on which the bracket 55 is mounted on the upright member 33. The clamp 62 which is attached to the lower bracket 55 is rotated about the axis X—X to engage the clamp 62 with the down tube 26 and the wing nut 63 is tightened to secure the down tube 26 to the carrier 20.

A second bicycle 22a is next elevated and mounted in an opposite direction on the hanger brackets 49, 50 behind the first bicycle 22b such that the rearmost retaining bend 48 of right hanger bracket 49 engages the corner 51 where the seat tube 29 joins t he rear fork 31, and the rearmost retaining bend 48 of the left hanger bracket 50 engages the dropped top tube 27. The longer rearward extending lower bracket 56 is vertically adjusted on the upright member 33 to engage the down tube 26, by loosening the "U" bolt 53 and sliding the plate 52 on which the bracket 56 is mounted on the upright member 33. The clamp 62 is rotated about the axis X—X to engage the down tube 26 and the wing nut 63 is tightened to secure the down tube 26 of the rearmost bicycle 22a to the carrier 20.

From the foregoing it is apparent that our invention provides a means for carrying bicycles on motor vehicles which is easy to install, easy to use and is adaptable to vehicles which are equipped with conventional draw bar hitches. Moreover, our bicycle carrier is sturdy, reliable and adaptable to a variety of bicycle sizes and styles.

Although a single preferred embodiment of the invention has been illustrated and described, it is not intended to limit the scope of the invention to this embodiment and it will be appreciated that other embodiments can be derived by changes in material, size, shape, substitution of parts and changes in the arrangement of parts without departing from the spirit thereof.

We claim:

1. A universal carrier having a three point mounting arrangement for transporting bicycles, one behind the other, on a motor vehicle comprising, in combination: a slender upright member; a means for detachably securing a lower end portion of said upright member to a motor vehicle; a slender transverse horizontal member fixedly attached at the center thereof to said upright member; a pair of slender longitudinal horizontal brackets, each of said brackets having a base end portion fixedly attached to an end portion of said transverse member and adapted to support an upper portion of at least one bicycle; a third slender longitudinal horizontal bracket slideably attached below said first pair of brackets to said upright member, said third bracket being vertically adjustable on said upright member and adapted to support a third portion of said bicycle; and a means for adjusting the vertical position of said third bracket on said upright member.

2. The bicycle carrier recited in claim 1 further comprising an arm pivotally attached to said upright member above said slender pair of horizontal brackets, said arm being selectively rotatable to a substantially horizontal position and to a substantially vertical position for retaining said upper portions of said bicycle on said first pair of brackets.

3. The bicycle carrier recited in claim 2 further comprising a means for locking said arm to said upright member when said arm is in said substantially horizontal position.

4. The carrier with a three point mounting arrangement for transporting bicycles recited in claim 3 wherein said means for locking said swing arm to said upright member in said horizontal position comprises a pair of plates fixedly attached to said upright member for rotatably straddle mounting said swing arm to said upright member, said plates and said swing arm having aligned apertures for receiving a locking pin, a locking pin for engaging the apertures in said plates to lock said swing arm in said horizontal position.

5. The bicycle carrier recited in claim 1 further comprising a fourth slender longitudinal horizontal bracket slideably attached below said first pair of brackets to said upright member and vertically adjustable on said upright member.

6. The bicycle carrier recited in claim 1 wherein said upright member is a slender rectangular tube.

7. The carrier with a three point mounting arrangement for transporting bicycles recited in claim 1 wherein said carrier is adapted to support bicycles having a top tube and an adjoining rear fork and one of said first pair of longitudinal brackets are adapted to engage a bicycle's top tube and the other of said first pair of brackets are adapted to engage a corner of said bicycle where the bicycle's top tube joins said bicycle's rear fork.

8. The carrier with a three point mounting arrangement for transporting bicycles recited in claim 1 wherein said means for detachably securing said upright member to the rear end of a motor vehicle comprises an adapter removably attached to the lower end of said upright member for securing said upright member to a tow bar type hitch.

9. The carrier with a three point mounting arrangement for transporting bicycles recited in claim 1 wherein said means for adjusting the vertical position of said third bracket on said upright member comprises a plate for attaching an end portion of said bracket, a "U" bolt and a pair of nuts for releasably clamping said plate to said upright member.

10. The carrier with a three point mounting arrangement for transporting bicycles recited in claim 1 wherein each of said first pair of longitudinal horizontal brackets has at least one concave bend for locating said bicycle on each of said brackets.

11. The carrier with a three point mounting arrangement for transporting bicycles recited in claim 1 further comprising a clamp attached to the outer end portion of said third longitudinal extending bracket for securing said lower portion of said bicycle to said third bracket.

12. The carrier with a three point mounting arrangement for transporting bicycles recited in claim 1 wherein said first pair of brackets and said third bracket extend rearwardly from to said upright member.

13. A carrier having a three point mounting arrangement for transporting bicycles, one behind the other, on a motor vehicle comprising, in combination: a slender upright member; a means for detachably securing a lower end portion of said upright member to a motor vehicle; a slender transverse horizontal member fixedly attached at the center thereof to said upright member; a pair of slender longitudinal horizontal brackets, each of said brackets having a base end portion fixedly attached to an end portion of said transverse member and adapted to support an upper portion of at least one bicycle; an arm pivotally attached to said upright member above said pair of slender horizontal brackets, said arm being selectively rotatable to a substantially horizontal position and to a substantially vertical position for retaining said upper portions of said bicycle on said first pair of brackets; a means for locking said arm in said substantially horizontal position; a third slender longitudinal horizontal bracket slideably attached below said first pair of brackets to said upright member, said third bracket being vertically adjustable on said upright member and adapted to support a third portion of said bicycle; and a means for adjusting the vertical position of said third bracket on said upright member, said means comprising a plate for attaching an end portion of said third bracket, a "U" bolt and a pair of nuts for releasably clamping said plate to said upright member.

14. A universal carrier having a three point mounting arrangement for transporting men's, women's and children's bicycles, crosswise, one behind the other, on a motor vehicle comprising, in combination: an upright member adapted to be attached to the rear end of a vehicle; a means on the upper end portion of said upright member for supporting each bicycle of a pair of opposite facing bicycles in transverse relationship to said vehicle on at least at two points on a bicycle carrier, a swing arm having a base end pivotally attached to said upright member, said arm being angularly adjustable from a substantially horizontal locked position to a raised unlocked position for mounting each of said bicycles on said two points; a means for locking said swing arm to said upright member in said horizontal position, said means comprising a pair of plates fixedly attached to said upright member for rotatably straddle mounting said swing arm to said upright member, said plates and said swing arm having aligned apertures for receiving a locking pin, a locking pin for engaging the apertures in said plates to lock said swing arm in said horizontal position; and a means on the lower end portion of said upright member for vertically supporting each of said pair of bicycles on a third point on said carrier, said means being vertically adjustable on said upright member.

* * * * *